C. S. FISH.
FRUIT SLICER.
APPLICATION FILED AUG. 20, 1921.
1,399,950.
Patented Dec. 13, 1921.
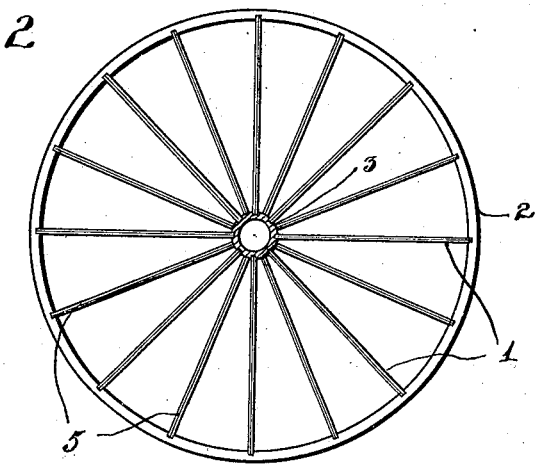
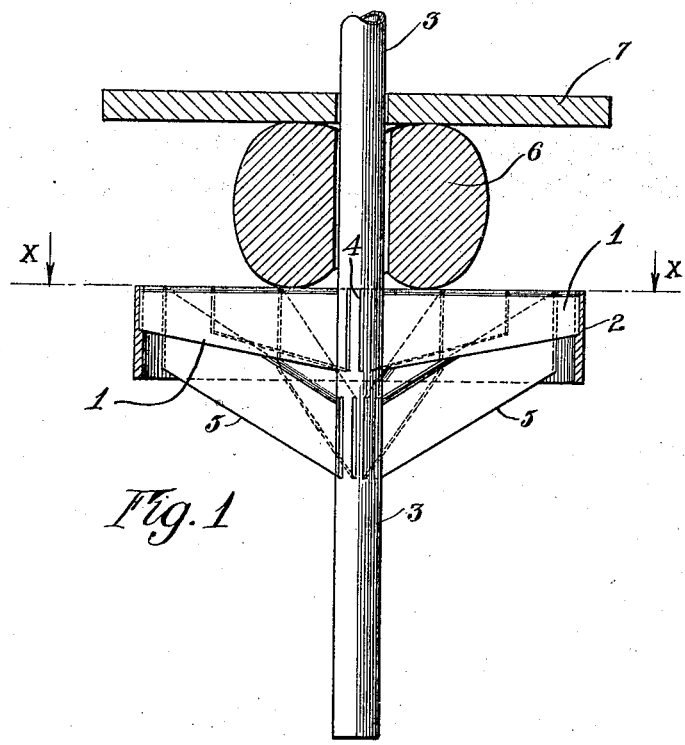
INVENTOR.
Charles S. Fish.
BY
his ATTORNEY.

UNITED STATES PATENT OFFICE.

CHARLES S. FISH, OF ROCHESTER, NEW YORK, ASSIGNOR TO BOUTELL MANUFACTURING CO., OF ROCHESTER, NEW YORK, A CORPORATION OF NEW YORK.

FRUIT-SLICER.

1,399,950. Specification of Letters Patent. Patented Dec. 13, 1921.

Application filed August 20, 1921. Serial No. 493,842.

*To all whom it may concern:*

Be it known that I, CHARLES S. FISH, of Rochester, in the county of Monroe and State of New York, have invented certain new and useful Improvements in Fruit-Slicers; and I do hereby declare the following to be a full, clear, and exact description of the same, reference being had to the accompanying drawings, forming a part of this specification, and to the reference-numerals marked thereon.

My present invention relates to a means for slicing or subdividing fruit, and particularly cored apples, whereby the fruit may be cut into a large number of small wedge shaped slices without liability of breaking the same.

Ordinarily in attempting to cut cored apples into relatively thin slices extending longitudinally of the core, great difficulty has been encountered by reason of the splitting of reasonably ripe fruit, but by the use of the device hereinafter described the result may be readily accomplished and the fruit divided into even sixteenths at the same time preserving the integrity of the slices.

In the accompanying drawing:

Figure 1 represents a vertical sectional view through a slicing apparatus embodying my improvements, and Fig. 2 is a horizontal sectional view on the line *x—x* looking down.

Similar reference numerals throughout the several views indicate the same parts.

The invention broadly considered lies in the provision of a plurality of series of radially extending slicing knives, portions of the knives of the succeeding series overlapping the first in such manner that the slices formed by the first series will be subdivided by the knives of the second series before leaving the first mentioned one. As an additional feature the arrangement of the second series of knives with their cutting edges in conical form tapering toward the central support within the core aperture is advantageous whereby when cored fruit is being operated upon the fruit is steadied and the narrow ends of the slices formed by the first series held during passage through the cutting apparatus.

The present embodiment of my invention consists of a series of knives or cutting blades 1 having their upper sharpened edges preferably extending in approximately the same plane, with their outer ends secured to a sustaining ring 2 and preferably recessed therein, as shown, and their inner ends supported upon a support or rod 3 in which are formed recesses 4 for the reception of the said knife ends 1. In the present form, these knives 1 are arranged to cut the fruit into eighths and beyond the knives 1 is another series of knives 5 not only radiating from the rod 3, and having their inner and outer ends attached to the ring and the tube as shown, but the upper portions of the cutting edges are arranged between the outer edges of the knives 1 and their cutting edges are inclined relative to the vertical plane of the rod 3 and the upper cutting edges of the knives 1, thus forming a cone with its apex toward the support and beyond the upper series in the direction of movement of the front relative to the knives during the slicing operation. The cored fruit to be sliced, indicated at 6, is impaled upon the rod or support 3 and is then pressed downwardly through the knives by means of presser or platen 7 operated by hand or in any particular manner, the particular construction of this pressing device not being material to my invention, and as it is the relative movement of the parts that counts, the presser could be stationary and the knives moved, though I prefer the former arrangement. When the fruit is positioned as shown, and moved relatively to the knives, it is first subdivided into eighths or any other number of sections by the knives 1, and the subdivisions of the sections before leaving these knives encounter the cutting edges of the knives 5 and are severed by the latter into sixteenths or other desired number of sections. The inclination or conical arrangement of the second series of knives relative to the path of travel of the fruit through the slicing device causes it to hug the centering rod or support 3 and prevents crushing or breaking the thinner edges of the fruit, as will be understood.

This device is found in practice to be well adapted for the purpose intended, and the percentage of perfectly sliced fruit obtained by its use is very large. It is, of course, immaterial whether the fruit is caused to move through the slicing device by means of a pressing board, by hand, or otherwise, as the result is substantially the same.

I claim as my invention:

1. A fruit slicer comprising two series of radial slicing knives, the knives of one series being arranged intermediate those of the other series and the cutting edges of one series overlapping the bodies of the other series for a portion of their length.

2. A fruit slicer comprising two series of radial slicing knives, the knives of one series being arranged intermediate those of the other series and the cutting edges of one series being inclined relative to those of the other and to the direction of relative movement of the fruit during the slicing operation.

3. A fruit slicer comprising two series of radial slicing knives, the knives of one series being arranged intermediate of those of the other and having their cutting edges at an angle to those of the other and converging in the direction of the movement of the fruit relative to the knives during the slicing operation.

4. A fruit slicer comprising two series of radial slicing knives, the knives of one series being arranged intermediate those of the other series and the cutting edges of the other series overlapping the knives of the first series and converging in the direction of the movement of the fruit relative to the knives during the slicing operation.

5. A fruit slicer comprising a central fruit support, a series of slicing knives radiating therefrom, a second series of similar radial slicing knives having their cutting edges arranged in form of a cone, the apex extending toward the support and in the direction of movement of the fruit, the outer portion of said edges overlapping the bodies of the knives of the first series.

6. A fruit slicer comprising a central fruit support, an outer ring, two series of radial slicing knives attached at their outer ends to the ring and at their inner ends to the fruit support, one series of knives having the cutting edges arranged in the form of a cone with the apex extending toward the center support and in the direction of the movement of the fruit relatively to the knives during the slicing operation and having the outer portions of said cutting edges arranged between the knives of the other series and intermediate the edges thereof.

7. A fruit slicer comprising a central fruit support, a series of cutting knives radiating therefrom and a second series of knives alternating with the knives of the first series inclined toward the support in the direction of its length, and having portions of their cutting edges extending beyond the bodies of the first series.

8. A fruit slicer comprising a central fruit support, a series of slicing knives radiating therefrom and a second series of similar radiating knives having portions only of their cutting edges arranged intermediate the bodies of the knives of the first series.

CHARLES S. FISH.